Dec. 31, 1940.   K. M. KEITH   2,226,563
COMBINE ADJUSTMENT MECHANISM
Filed Jan. 22, 1940   3 Sheets-Sheet 1

Inventor
Kenneth M. Keith
By Carlsen & Hayle
Attorneys

Dec. 31, 1940.   K. M. KEITH   2,226,563
COMBINE ADJUSTMENT MECHANISM
Filed Jan. 22, 1940   3 Sheets-Sheet 2

Inventor
Kenneth M. Keith
By Carlsen + Hayle
Attorneys

Dec. 31, 1940.    K. M. KEITH    2,226,563
COMBINE ADJUSTMENT MECHANISM
Filed Jan. 22, 1940    3 Sheets-Sheet 3

Inventor
Kenneth M. Keith
By Carlson & Hayle
Attorneys

Patented Dec. 31, 1940

2,226,563

UNITED STATES PATENT OFFICE 2,226,563

COMBINE ADJUSTMENT MECHANISM

Kenneth M. Keith, Minneapolis, Minn., assignor to Minneapolis-Moline Power Implement Company, Minneapolis, Minn., a corporation of Delaware Application January 22, 1940, Serial No. 314,972

4 Claims. (Cl. 56—23)

This invention relates generally to improvement in adjustment mechanism for combined harvesting and threshing machines, and more particularly to a means for adjusting the crop cutting device and reel of such machine.

The usual combine includes a harvesting device or cutter operated in conjunction with a rotating reel for cutting the crop or grain, a conveyor for carrying the cut grain to a threshing mechanism and other operating parts which separate the grain from the straw, chaff, or other foreign matter, all these operations taking place simultaneously as the machine advances over the field. The present invention has particular reference to a combine in which the reel and cutter are forwardly located ahead of a rearwardly moving conveyor for carrying off the cut grain and which mechanism constitutes what is termed a header, since its purpose is to sever only as much of the grain as is necessary to ensure gathering of the heads.

The primary object of the invention is to provide an improved means for adjustably supporting the header assembly whereby it may be raised and lowered to any desired elevation to cut the grain at a selected height above the ground. Another object is to provide means for adjusting the cutter or sickle and the header reel independently in such manner that the reel may be maintained at best operating position with respect to the cutter, and for adjusting both cutter and reel simultaneously without disturbing their relative positions to each other. A further object is to provide means whereby the normal range of adjustment of the header structure may, without additional parts, be extended to dispose the header a relatively great distance above the ground and thus facilitate the harvesting of certain crops such as standing row crops of different varieties.

These and other more detailed and specific objects will be disclosed in the course of the following specification, reference being had to the accompanying drawings, in which—

Figure 1:
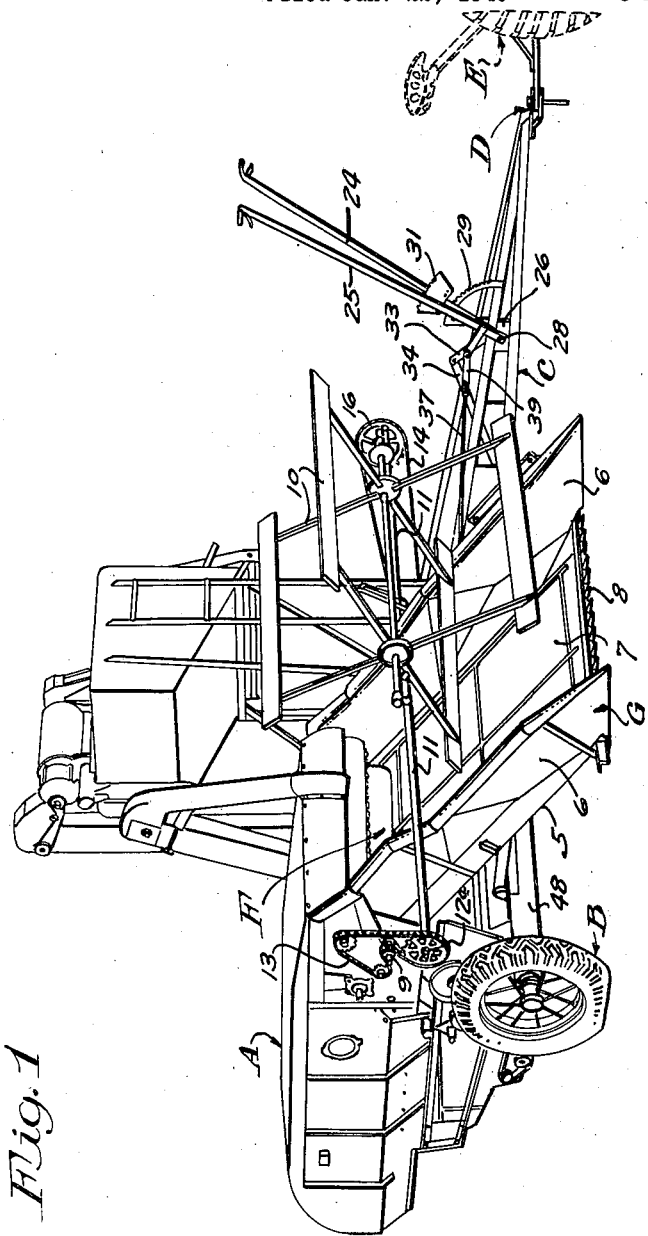
Fig. 1 is a frontal perspective view of a combine equipped with my improved header and adjustment mechanism. A fragment of the pulling tractor is shown in dotted lines.

Referring now more particularly and by reference characters to the drawings, A represents generally the main body or housing portion of the combine which is supported by transversely spaced wheels B and includes on one side a frame C forwardly extended to a hitch D by which the combine is connected to the tractor E. The body A thus travels a path alongside that of the tractor, as will be apparent.

The body A contains the threshing and cleaning mechanism (not shown) which may be of any suitable form, and the cut grain enters this mechanism at the front through an opening F in the upper frontal portion of the body.

The header mechanism or structure is designated generally at G and comprises as its main elements a supporting member or elevator 5 having spaced side walls 6 and intervening raddle conveyor or canvas 7, and a forwardly and transversely located crop cutting device or sickle 8. This assembly is vertically adjustable at its forward end about the axis of the shaft 9 which also drives the conveyor 7 to thus vary the height at which the grain is cut by the sickle 8, the cut grain of course falling as it is cut onto the conveyor to be carried thereby rearwardly into the threshing and cleaning mechanism.

A header reel 10 of substantially usual form is supported for rotation about a transverse axis above the sickle 8 by arms 11 which extend rearwardly and are secured at 11a to a transverse tubular sleeve 12 journaled in the header structure. This sleeve receives a shaft 12a which is rotated by chain drive 13 and actuates the reel through a chain 14 run over the sprockets 15 and 16 so that the reel rotates and moves rearwardly at its underside to thereby brush the grain back onto the conveyor 7 as it is cut.

Figure 2:
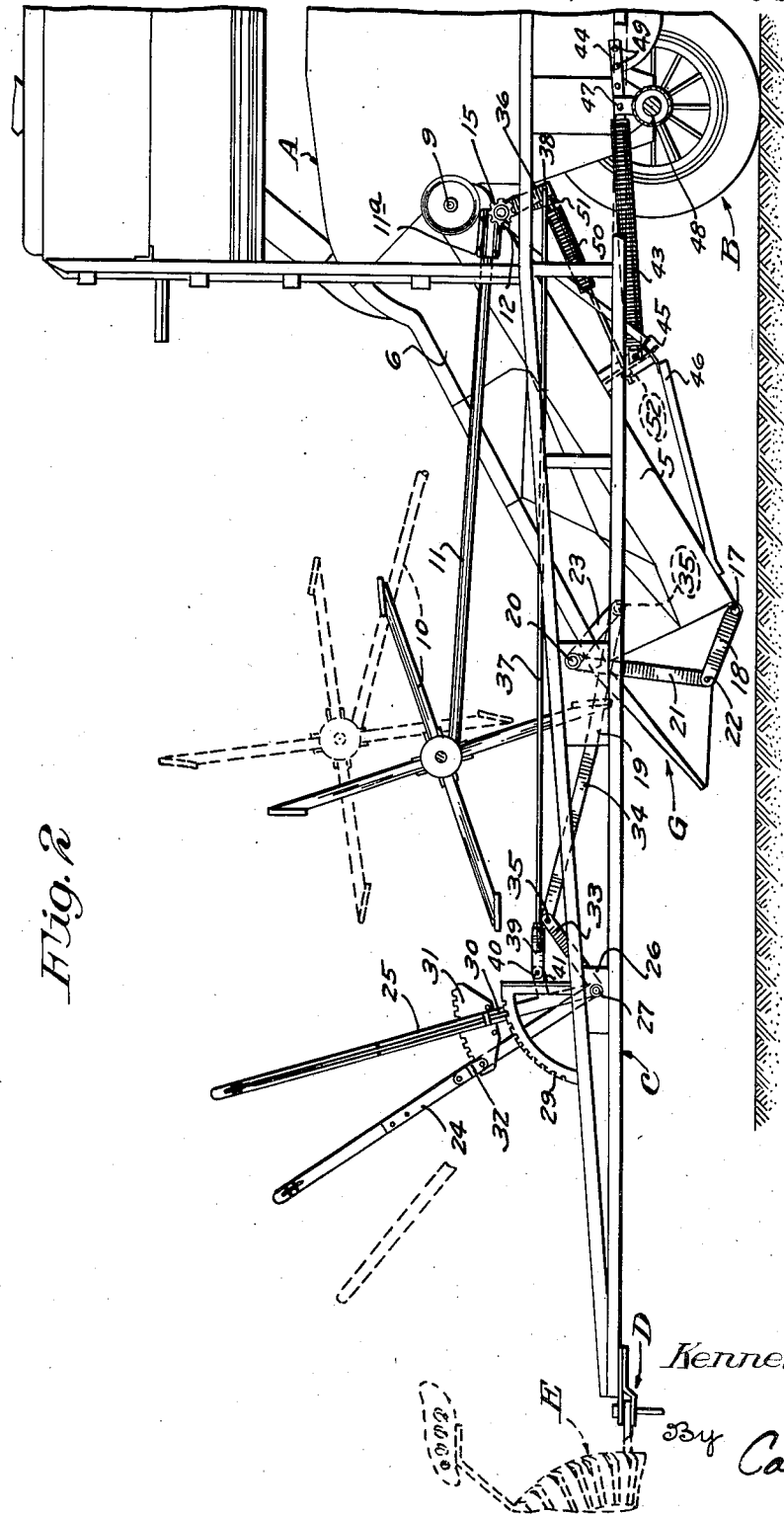
Fig. 2 is an enlarged left side elevation of the header structure and adjustment mechanism and forward parts of the combine, the reel being shown in a separate adjusted position in dotted lines.

For adjusting and supporting the header structure, I provide the mechanism now to be described. The forward corner portion of the header elevator 5 is provided with a transversely axised and laterally extended pin 17 upon which is pivotally mounted a link or arm 18. At a point on the frame C substantially forward and above the location of this pin 17, in the down position of the header shown in Figs. 1 and 2, transversely spaced vertical bearing plates 19 are mounted, and journaled on a transverse axis therethrough is a rock shaft 20. A lift lever 21 is rigidly secured to an end portion of the shaft 20 over the arm 18 and at its end is pivotally connected at 22 to the end of this arm. An operating lever or arm 23 is secured to an intermediate portion of the shaft 20 and the assembly is such that a forward and upward swinging movement of the lever 23 and resulting oscillation of the shaft 20, in a clockwise direction as viewed in Fig. 2, will swing the lift lever 21 in the same direction and by pulling upon the arm 18 will pull the forward end of the elevator 5 upwardly, the levers 21 and 23 cooperating to effectively form a bell-crank as viewed laterally. In this operation the elevator swings about its pivot axis 9 as indicated by the arrow in Fig. 2, and the height at which the grain is cut by sickle 8 will of course thus be varied.

A pair of hand or latch levers 24 and 25 are pivotally mounted at the forward end portion of the frame C, ahead of the operating mechanism thus far described, and for this mounting I provide spaced bearing plates 26 in the frame to receive a transversely journaled tubular shaft 27. One lever 24, hereinafter termed the header adjusting lever, is rigidly secured to this shaft 27 while the other 25, hereinafter termed the reel adjusting lever, is connected to a shaft 28 telescopically mounted in said tubular shaft, the two levers being thus adjustable about a common axis.

A toothed segment frame or quadrant 29 is secured to the frame C and the reel adjustment lever 25 is provided with the usual hand controlled latch 30 which engages this segment to lock the lever in adjusted angular position. Said lever 25 further has secured thereto, a toothed segment 31, the teeth of which are cut on an arc centered at the axis about which both levers are adjusted, and the header adjusting lever 24 is provided with a hand controlled latch 32 to engage this segment and thus lock the lever at any adjusted angular position relative to lever 25.

An arm 33 is rigidly secured to the tubular shaft 27 and a link bar 34 is pivotally connected at its ends at 35 between this arm and the hereinbefore described lever 23 so that, by swinging the hand lever 24 the header may be raised and lowered as will be understood. It will be noted that both levers 24 and 25, being forwardly located on the combine frame, are in position at all times for convenient manipulation by the tractor operator from his seat on the tractor E pulling the combine.

The sleeve 12 at its end, and of course on the same side of the combine as the other adjusting mechanism, is provided with a rigidly mounted arm 36 extended in a generally downward direction. The rear end of an elongated link rod 37 is pivoted at 38 to the end of this arm 36, and at its forward end is slidably fitted into the end of a yoke member 39 which is pivotally connected at 40 to a member 41 extending from reel adjusting lever 25, the said link rod being threaded and provided with a take-up nut 42 for thus varying the effective length of the linkage between the lever 25 and arm 36. It is apparent that by swinging the hand lever 25 that the sleeve 12 may be oscillated on its axis to raise and lower the reel 10.

The weight of the header is partially compensated for by an expansion coil spring 43 which is coiled over a telescoping or lengthwise slidable member 44 pivoted at 45 to a lower brace frame 46 of the header and at its rear end pivoted by a cross pin in a bracket 47 secured to the wheel axle housing 48. Said rear end of member 44 is provided with a series of openings 49 for the selective reception of the cross pin so that the effective tension of the spring may be adjusted. The sleeve 12 is likewise yieldably urged in a direction serving to partially overcome the weight of the reel by means of a retractile coil spring 50 stretched between an arm 51 secured near the center of said sleeve and a part of the aforesaid brace frame 46, an adjusting nut 52 being provided for varying the tension of this spring. The function of the springs 43 and 50 is of course to relieve the operator of a part of the force necessary to raise the weight of both header and reel.

The levers 24 and 25 by their novel assembly and mounting cooperate in such manner that either the header 5 or reel 10 may be adjusted in vertical planes relative to each other or they may both be raised and lowered together. Thus the operator, by unlatching lever 25, may swing it forwardly or rearwardly, carrying along the lever 24 and raising or lowering both header and reel while maintaining the position of these parts relative to each other. The various levers and links are so proportioned as to bring about the properly coordinated movements in this operation, and the take-up connection of the reel link rod 37 with yoke member 39 is of particular importance in this respect.

After such an adjustment as the above is made, lever 24 may be unlatched and operated independently to raise or lower the header alone, thus bringing it into proper position relative to the crop and to reel 10. It is apparent, therefore, that by my invention any adjustments necessary to meet varying crop conditions may be conveniently made and may be conveniently carried out by the operator without leaving his seat on the tractor.

Figure 3:
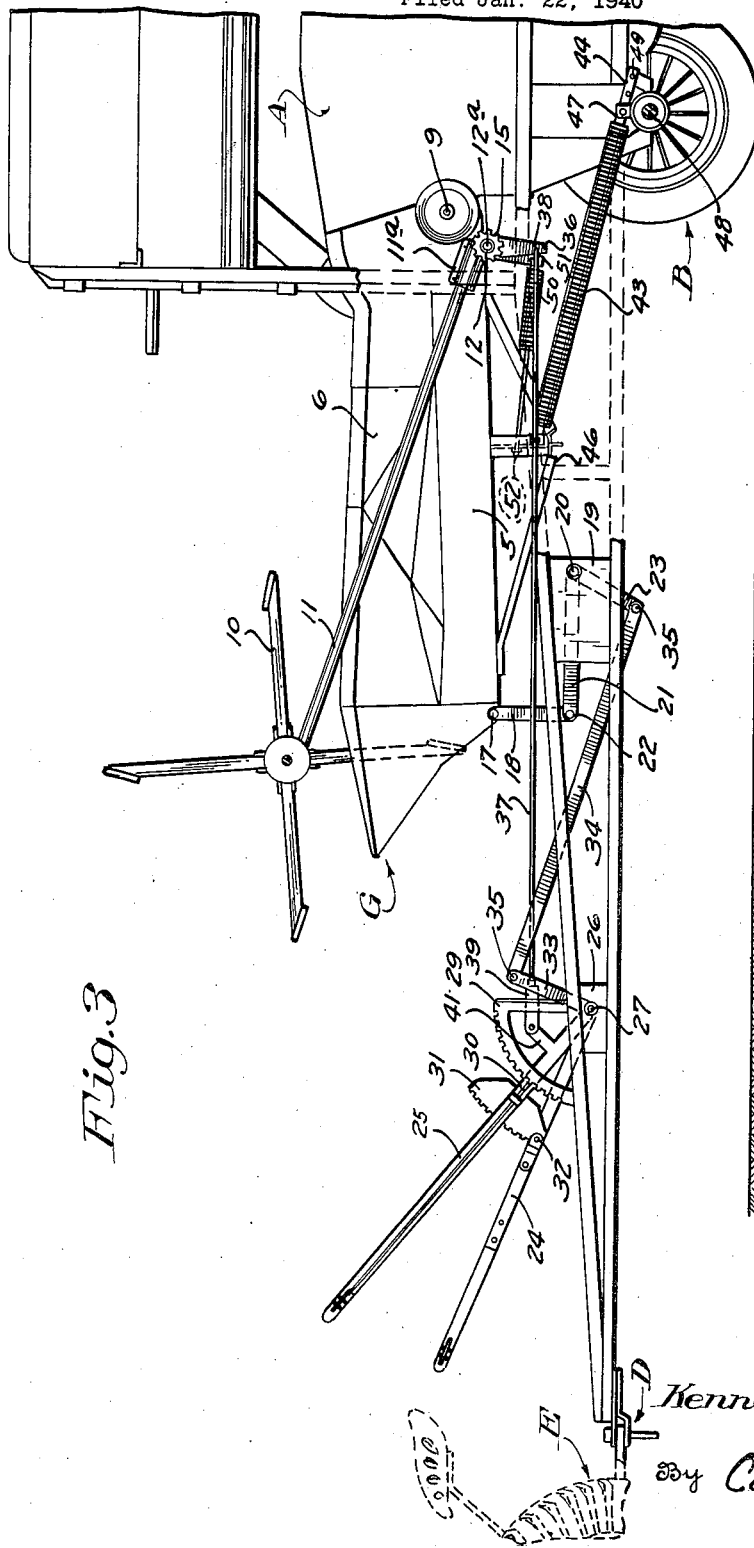
Fig. 3 is a view similar to Fig. 2, but showing the header structure raised to an upper position and adjustably supported thereat.
Figure 4:
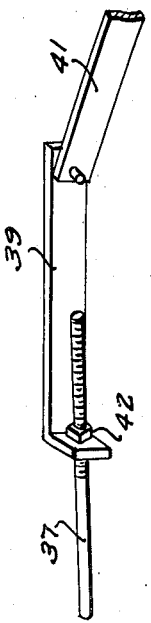
Fig. 4 is an enlarged perspective view of a portion of the header reel adjusting mechanism.

In the harvesting and combining of certain standing row crops, it is necessary or desirable to simply "top" or head the crop, and for this purpose the header and reel should be raised substantially further above ground than is usually possible. By my invention such adjustment may be carried out easily and without requiring any additional parts or structure whatever. To do this the link 18 is disconnected from the lever 21 at 22 and the header 5 is raised by hand until the link hangs down from the pin 17 in position for connection again, in depended position this time, to the lever. The header is thus supported above the lever 21 and is raised a substantial amount above the uppermost limits of its previous range of adjustment, as is clearly shown in Fig. 3. The header may again be raised and lowered about this elevated position for best adjustment to the crop in the manner hereinbefore set forth.

In raising the header thus, the reel 10 is of course raised also and in order to restore the proper coordination in the positioning and movement of the reel and header, the link rod 37 is taken up at its connection with the yoke member 39 by means of the nut 42, as will be understood.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a harvester for attachment behind a tractor, a wheel supported frame extending forwardly for draft connection with the tractor, a cutting mechanism connected with the frame for vertical adjustment at its front end about a rearwardly disposed transverse axis, a reel disposed adjacent the cutting mechanism and mounted for adjustment about a transverse axis adjacent to said first mentioned axis, a pair of hand levers fulcrumed on the frame in a position for manipulation by an operator on the tractor, operative connections between one of said levers and the reel, and operative connections between the other lever and the cutting mechanism, said last mentioned connections including a bell-crank fulcrumed on said frame and links connecting the respective arms of the bell-crank to the last mentioned lever and cutting mechanism.

2. In a harvester, a forwardly extending wheeled frame, a cutting mechanism mounted on the frame for vertical adjustment about a transverse axis, a bell-crank fulcrumed on the frame adjacent the cutting mechanism, a hand lever fulcrumed on the frame forwardly of said bell-crank, a link connecting the bell-crank and hand lever, and a second link connecting the bell-crank and cutting mechanism.

3. In a harvester, a forwardly extending wheeled frame, a cutting mechanism mounted on the frame for vertical adjustment about a transverse axis adjacent the cutting mechanism, a hand lever fulcrumed on the frame forwardly of said bell-verse axis, a bell-crank fulcrumed on the frame crank, a link connecting the bell-crank and hand lever, and a second link connecting the bell crank and cutting mechanism, said second link being detachable from the cutting mechanism and swingable on the bell-crank into another position for reattachment to the cutting mechanism with the latter in a vertically converted position.

4. In a harvester, a wheel supported frame, a cutter vertically adjustable with respect to the frame, a manually controlled adjuster member mounted on the frame adjacent one side of the cutter to raise and lower the same, a link forming an operative connection between the member and cutter and extending downward from the member to normally suspend the cutter in a relatively low operating position, the parts being so constructed and arranged that the link may be disconnected from the cutter, swung to an upstanding position above the member, and resecured to the cutter with the latter raised to a relatively high position.

KENNETH M. KEITH.

CERTIFICATE OF CORRECTION.

Patent No. 2,226,563.                                                December 31, 1940.

KENNETH M. KEITH.

It is hereby certified that error appears in the printed specification of the above numbered patent requiring correction as follows: Page 3, second column, line 3, claim 3, strike out the syllable and words "verse axis, a bell-crank fulcrumed on the frame" and insert the same before "adjacent" in line 1, same claim; and that the said Letters Patent should be read with this correction therein that the same may conform to the record of the case in the Patent Office.

Signed and sealed this 25th day of February, A. D. 1941.

(Seal)
Henry Van Arsdale,
Acting Commissioner of Patents.